Dec. 8, 1953  W. J. ALBERT  2,661,860
AUXILIARY DRAIN PLUG
Filed Nov. 15, 1951

INVENTOR.
William J. Albert
BY Victor J. Evans & Co.
ATTORNEYS

Patented Dec. 8, 1953

2,661,860

UNITED STATES PATENT OFFICE 2,661,860

AUXILIARY DRAIN PLUG

William J. Albert, South Bend, Ind.

Application November 15, 1951, Serial No. 256,581

1 Claim. (Cl. 220—24.5)

This invention relates to drain plugs used in floor drains in basements or in clean-out openings in tanks and plumbing fixtures such as drain pipes from bathrooms and lavatories to sewers, and in particular a hollow plug of resilient material having a tapering thread on the inner surface and provided with an externally threaded hub or washer which when actuated by a handle extended through the outer end of the plug expands the plug whereby a positive seal is provided in a drain pipe or in plumbing fixtures of different types.

The conventional drain plug, which is operated by a wrench is difficult to remove, particularly in an emergency primarily because fittings in which the plugs are used are usually formed of cast iron which rusts and corrodes. With this thought in mind this invention contemplates a resilient drain plug or seal that is readily inserted in the end of a pipe, fitting, or drain opening in a tank, or the like, and with the shell or casing formed of rubber or other resilient material and having a tapering thread on the inner surface the device is readily expanded and may readily be removed and replaced.

The object of this invention is, therefore, to provide an auxiliary drain plug and seal for drain openings in which the parts are readily actuated by hand.

Another object of the invention is to provide an auxiliary drain plug and seal that may readily be used in drain openings, plumbing fixtures and the like without changing the fixtures or parts thereof.

A further object of the invention is to provide a drain plug and seal which is of a simple and economical construction.

With these and other objects and advantages in view the invention embodies a cylindrical casing having a tapering threaded inner surface formed of resilient material and having a flange with an extended edge at one end, and a threaded disc having a handle extended through the flange at the end of the casing whereby with the disc positioned in the casing it is readily actuated by the handle to expand or release the plug.

Other features and advantages of the invention will appear from the following description taken in connection with the drawings wherein:

Figure 1 is a plan view of the auxiliary plug showing the plug positioned in an opening in a plate such as the wall of a tank, or the like.

Figure 1:
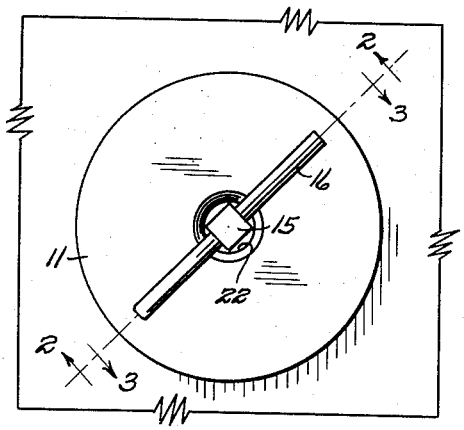

Referring now to the drawings wherein like reference characters denote corresponding parts the auxiliary drain plug of this invention includes a cylindrical casing 10 having a flange 11 with an extended edge 12 at one end, a disc 13 having threads 14 on the outer surface positioned in the casing, a square stem 15, extended from the disc, and a rod 16 extended through an opening 17 in the end of the stem.

The inner surface of the casing 10, which is formed of resilient material, tapers from a comparatively thin edge 18 at the lower end to the flange 11 with the thickness of the wall gradually increasing from the point 18 to the flange. The inner surface is provided with threads 19 and the threads are positioned to correspond with the threads 14 on the disc 13.

The disc 13 is provided with a square hole or centrally positioned opening 20 and with the parts assembled, the inner end of the stem 15 is secured in the opening 20 by welding or other suitable means.

Figure 2:
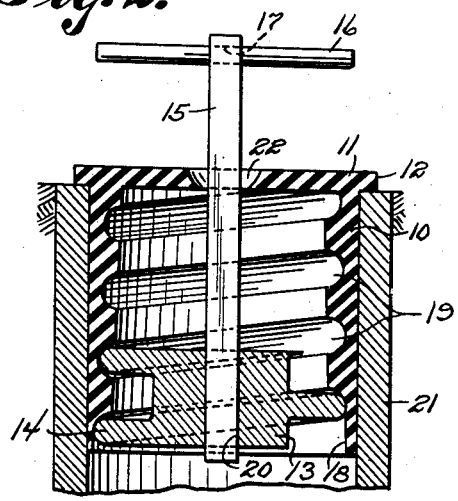
Figure 2 is a vertical section through the plug taken on line 2—2 of Figure 1.
Figure 3:
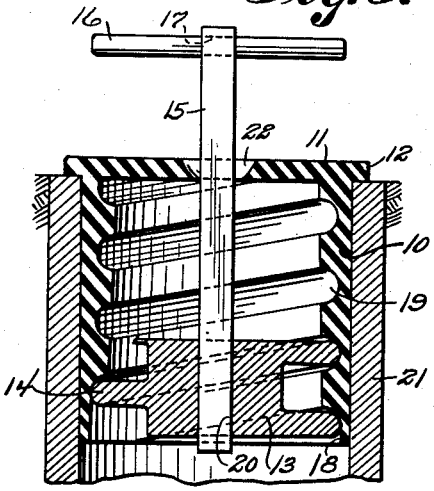
Figure 3 is a similar section taken on line 3—3 of Figure 1.
Figure 4:
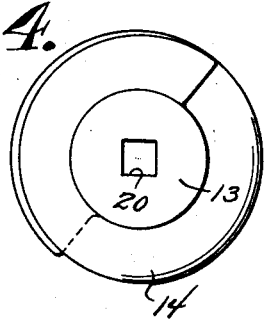
Figure 4 is a plan view of the disc used for expanding the plug.
Figure 5:
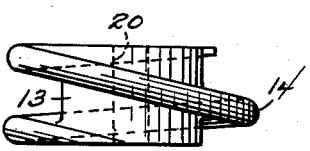
Figure 5 is a side elevational view of the disc.

With the parts formed in this manner the plug may be inserted in a plate such as the wall of a tank or the like, as shown in Figure 1, or in the end of a pipe, tube or fitting as indicated by the numeral 21 and shown in Figures 2 and 3 and with the disc 13 positioned in the lower or open end of the casing 10 the plug may readily be removed and replaced from the opening or fitting.

When it is desired to seal the plug in the opening or fitting the disc 13 is rotated by the handle 16 and as the disc travels toward the closed end of the casing 10 the wall of the casing or plug is expanded thereby providing a positive seal between the outer surface of the wall of the plug and the inner surface of the fitting or opening.

The improved auxiliary drain plug of this invention may, therefore, be readily inserted in and also secured in an opening in a drain connection, wall, or fitting and the parts may be operated by turning the handle 16 with the thumb and fingers of a hand or with a wrench or the like, as may be desired.

With the parts formed as shown on the drawing the extended flange 12 prevents the plug dropping into the opening and the stem 15 extends through an opening 22 in the center of the flange.

It will be understood that modifications may be made in the design and arrangement of the parts without departing from the spirit of the invention.

What is claimed is:

In an auxiliary drain plug, the combination which comprises a cylindrical sleeve of resilient material having a tapering threaded inner surface, said sleeve having a web extended across one end and a flange providing an extended edge extended from the web, said web having a centrally positioned tapered opening therein, a disc having threads on the outer surface positioned in said sleeve, the diameter of the disc being greater than the smallest inner diameter of the sleeve, a square stem extended from the disc through the tapered opening in the web at the end of the sleeve and fixed at its lower end to the disc, and a rod serving as a handle extended through the outer end of the stem for rotating the disc in the sleeve to expand the sleeve by reason of the larger diameter of the disc in relation to the smaller diameter of the tapered inner surface of the sleeve.

WILLIAM J. ALBERT.

References Cited in the file of this patent

UNITED STATES PATENTS

| Number | Name | Date |
|---|---|---|
| 1,446,223 | Thompson et al. | Feb. 20, 1923 |
| 2,081,132 | Barnes | May 25, 1937 |
| 2,324,545 | Svirsky | July 20, 1943 |
| 2,355,492 | White | Aug. 8, 1944 |

FOREIGN PATENTS

| Number | Country | Date |
|---|---|---|
| 318,934 | France | July 8, 1902 |
| 332,770 | Great Britain | July 31, 1930 |